United States Patent [19]

Bergquist

[11] Patent Number: 4,492,110
[45] Date of Patent: Jan. 8, 1985

[54] ULTRA SENSITIVE NOBLE GAS LEAK DETECTOR

[75] Inventor: Lyle E. Bergquist, Lakewood, Colo.

[73] Assignee: Martin Marietta Corporation, Bethesda, Md.

[21] Appl. No.: 499,825

[22] Filed: Jun. 1, 1983

[51] Int. Cl.³ .................. G01M 3/00; B01D 59/44
[52] U.S. Cl. .................. 73/40.7; 250/288; 417/49
[58] Field of Search .............. 73/40.7; 250/288, 289; 55/387; 417/48, 49

[56] References Cited

U.S. PATENT DOCUMENTS

| | | | |
|---|---|---|---|
| 3,057,996 | 10/1962 | Boyer. | |
| 3,070,992 | 1/1963 | Nemeth | 73/40.7 |
| 3,227,872 | 1/1966 | Nemeth. | |
| 3,342,990 | 9/1967 | Barrington et al. | 250/288 |
| 3,385,102 | 5/1968 | Briggs. | |
| 3,762,212 | 10/1973 | Morley et al. | 73/40.7 |
| 3,780,501 | 12/1973 | Porta et al. | 55/387 X |
| 3,961,897 | 6/1976 | Giorgi et al. | 417/49 X |
| 4,158,960 | 6/1979 | White et al. | 73/40.7 |
| 4,195,224 | 3/1980 | Sanger et al. | 250/289 |
| 4,260,886 | 4/1981 | Grilletto et al. | 250/288 |

OTHER PUBLICATIONS

Rosai, L. et al., *Purification of Rare Gases and the Measurement of Residual Impurity Levels*, J. Vac. Sci. Technol., vol. 11, No. 1, pp. 347–349, Jan./Feb. 1974.

Primary Examiner—Stephen A. Kreitman
Assistant Examiner—Joseph W. Roskos
Attorney, Agent, or Firm—Yount & Tarolli

[57] ABSTRACT

A noble gas leak detector is provided using a non-evaporable getter pump to remove active gases but not noble gases during leak detection. The vacuum system is constructed of all-metal valves, metal connection devices and metal passageways to reduce out gassing and minimize the permeation of helium into the system. Valves are appropriately located to seal off unnecessary devices during the actual leak detection. In addition, a process of calibrating a noble gas leak detector is provided using americium 241 alpha as the calibrating source.

5 Claims, 1 Drawing Figure

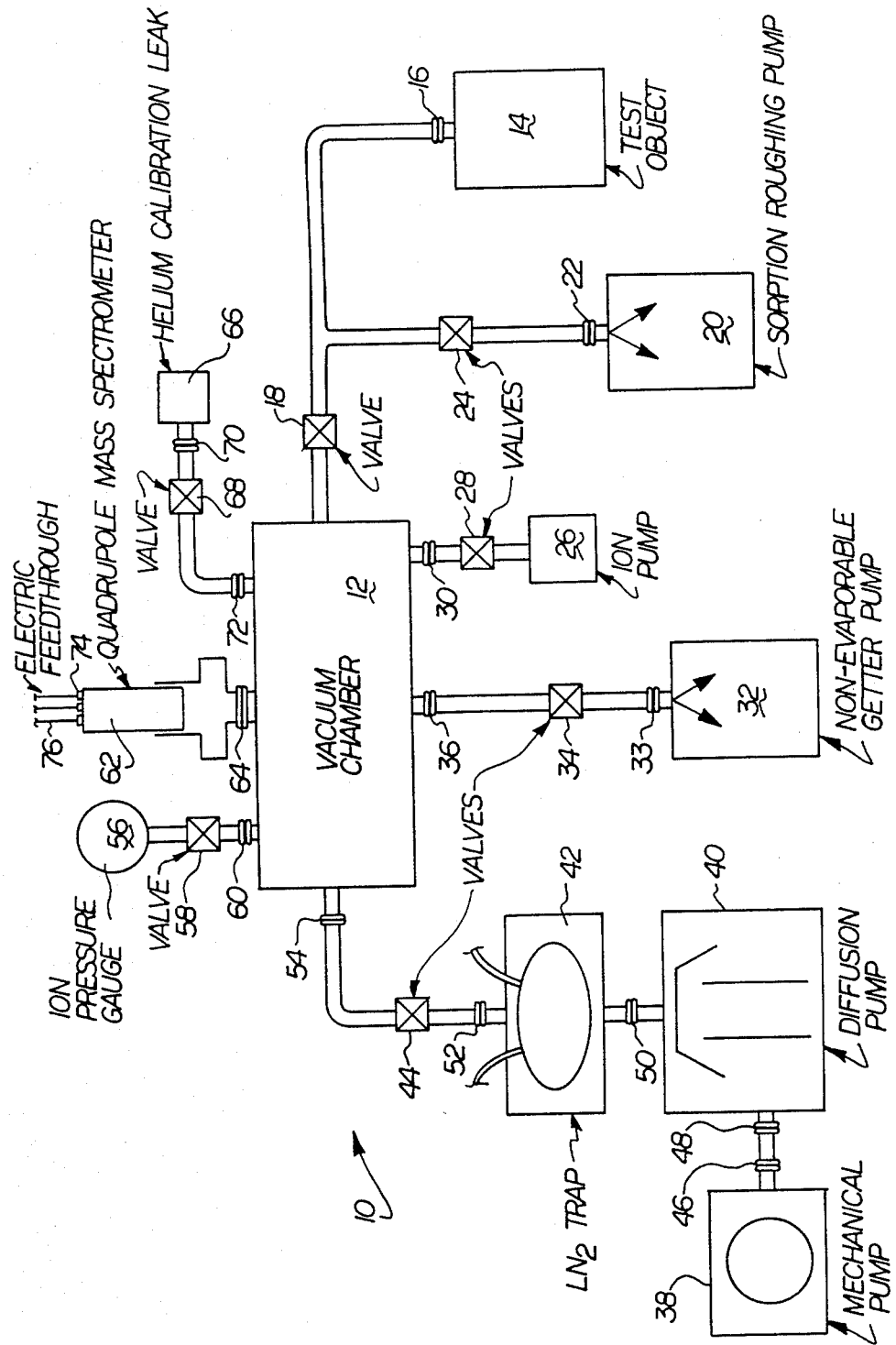

ULTRA SENSITIVE NOBLE GAS LEAK DETECTOR

FIELD OF THE INVENTION

The present invention relates to a noble gas leak detector and a method of calibration therefor.

BACKGROUND OF THE INVENTION
PRIOR ART

Noble gas leak detectors for detecting infinitesimally small leaks by means of inert noble tracer gases such as helium, argon, neon and the like, preferably helium, are known. One such detector is shown in U.S. Pat. Nos. 3,070,992 and 3,227,872. The leak detector disclosed in those patents has a mechanical pump and a diffusion pump to evacuate the system, a pressure gauge tube, a mass spectrometer to detect gaseous material and a getter pump to remove active gases during the leak checking process.

The leak detector shown in those patents was actually marketed by Vacuum Instrument Corporation ("VIC") of Long Island. The leak detector of those patents uses a titanium sublimation getter pump to remove the active gases and to hopefully leave the noble gases for leak detection. In using the VIC getter pumps helium may be entrapped under the titanium that is evaporated off of a filament, which allows helium later to slowly evolve. That slow evolution of helium causes undesirable helium background. The leak detector of those patents also uses a discharge gauge to measure the pressure in the system. Helium can either diffuse through the glass envelope of the gauge tube or desorb from its inner surfaces or perhaps both. That helium desorption will also cause unwanted helium background. Elastomeric O-rings were also used in connection means in the leak detector of those patents. The O-rings allowed helium to penetrate through the system which also causes high helium background. The leak detector as marketed in accordance with the foregoing patents was to have achieved a leak detection rate of $1 \times 10^{-14}$ atm cc/sec of helium. But because of the high helium background in the system, it could only repeatedly detect leaks larger than $10^{-12}$ atm cc/sec.

SUMMARY OF THE INVENTION

In order to overcome the problems of prior art noble gas leak detectors, the noble gas leak detector of the present invention uses a non-evaporable getter pump to remove the active gases during leak detection. A non-evaporable getter pump will not trap materials that can later desorb into the system causing undesirable background. Also, in order to minimize helium background, a vacuum system is constructed of passageways, valves and flanges made entirely of metal in order to reduce out gasing and minimize the permeation of helium into the system. Valves are used in appropriate locations in order to seal off various devices from the vacuum chamber so as to minimize desorption of undesirable gases causing background. In addition, a calibration method is provided using americium 241 alpha as a calibrating source.

The leak detector of the present invention improves the leak detection sensitivity over prior art leak detectors by two orders of magnitude. The sensitivity of the present invention is at least $10^{-14}$ atm cc/sec. The noble gas leak detector of the present invention uses a non-evaporable getter pump, preferably a SAES getter pump, in order to entrap active gases during leak detection. The system also includes evacuation means, such as a mechanical pump, a diffusion pump, and an ion pump, the latter being used to keep the system at low pressure during extended periods of nonuse. Each of those devices is sealed off from the vacuum chamber by appropriate all-metal valves in order to minimize unwanted helium background.

A gas detector is provided, and the gas detector can either be a quadrupole mass spectrometer or a magnetic sector mass spectrometer.

The internal vacuum system is constructed entirely of metal except for the electrical feed throughs for the gas detector. All internal passageways and connecting means are constructed of metal. Preferably, the connection means are flanges constructed of mating metal surfaces and metal gaskets.

The system also contains an ion pressure gauge which measures the pressure of the system, but it is sealed from the system by a valve during leak detection to avoid diffusion of helium either through the gas envelope of the ion gauge or as a result of desorption from its inner surface or both.

Three vacuum pumps are used besides the non-evaporable getter pump—a mechanical pump, a cold trap diffusion pump and an ion pump. The ion pump is used to keep the system evacuated during extended periods when not in use for leak detection. It is sealed from the system by a valve when leak checks are being made because of its high helium background. The cold trap diffusion pump is used to evacuate the system prior to making a leak check and after one has been made.

A new process of calibrating a noble gas leak detector is also provided. The calibrating source used is americium 241 alpha.

BRIEF DESCRIPTION OF DRAWING

The FIGURE schematically shows in block diagram form the noble gas leak detector of the present invention.

DETAILED DESCRIPTION OF PREFERRED EMBODIMENT

As shown in the FIGURE, a noble gas leak detector 10 is provided with a vacuum chamber 12. A test object 14 is connected to the vacuum chamber 12 through a flange 16 and a valve 18. For testing purposes, the object to be tested is sealed against flange 16, and the external surface of the object is purged with a noble gas, such as helium. Then, the detection process which is described in more detail below takes place.

A sorption roughing pump 20 is connected to the line between the test object 14 and the vacuum chamber 12. The sorption roughing pump 20 is connected to that line through a flange 22 and a valve 24. The purpose of the sorption roughing pump 20 is to evacuate the interior portion of the test object and to evacuate the line between the vacuum chamber and the test object. After evacuation, the sorption roughing pump 20 is sealed off from the system by closing the connecting valve 24.

Ion pump 26 is connected to the vacuum chamber 12 through a valve 28 and a connecting flange 30. The ion pump 26 is used to keep the system evacuated during extended periods when not in use for leak detecting. Otherwise, the ion pump 26 is sealed from the system by closing the valve 28.

A non-evaporable getter pump 32 is connected to the vacuum chamber 12 through a valve 34 and connecting flanges 33 and 36. The non-evaporable getter pump 32 is used to remove active gases during the leak detecting process. The non-evaporable getter pump 32 is selective in that it entraps only active gases but does not entrap the noble gases, such as helium. A preferred non-evaporable getter pump is the SAES getter pump available from SAS Getters S.P.A., Milan, Italy. The SAES getter pumps have large active surface areas and are activated by heating the getter to about 900° C. This activation drives the active gases inward to a more active site which permits the getter to be used in absorbing active gases in leak detecting processes. Noble gases which impinge upon the surface of the getter are not entrapped. When the outer surface of the getter is filled with active gases, it can be reactivated by reheating the getter to 900° C. The getter used in the SAES pump is a zirconium/aluminum alloy. Other getters which have been found useful in the present invention are zirconium/graphite and zirconium/iron alloys.

A mechanical vacuum pump 38 is connected to the vacuum chamber 12 through a diffusion pump 40 and a liquid nitrogen trap 42. A valve 44 is placed in a suitable location to seal off the units 38 and 40 from the vacuum chamber. A series of metal connecting flanges 46 through 54 are also provided.

The only nonmetallic substances in the system disclosed in the FIGURE are the insulators 74 surrounding the electric feed throughs 76 for the gas analyzer 62.

An ion pressure gauge 56 is connected to the vacuum chamber 12 in order to measure the pressure in the system. The ion pressure gauge 56 is connected through a valve 58 and a connecting flange 60. The valve 58 is closed during leak detection to minimize any contribution to the helium background which otherwise might be made by the ion pressure gauge 56.

The helium leakage rate is determined by a gas analyzer or detector 62. Preferably, the gas analyzer 62 is a quadrupole mass spectrometer. Alternatively, it may also be a residual gas analyzer, such as a Finnigan residual gas analyzer. The gas analyzer 62 is connected to the vacuum chamber 12 through a connecting flange 64.

The noble gas leak detector 10 of the present invention is calibrated by using a helium calibration leak 66, which is connected to the vacuum chamber 12 through a valve 68 and connecting flanges 70 and 72.

The surface interior portion of the vacuum chamber and the interconnecting passages may be pretreated to reduce to the out gassing and to minimize any entrapment of impinging molecules. Such pretreatment permits quicker evacuation as well as a lower ultimate pressure in the vacuum system. Any one of a number of available proprietary processes are suitable for pretreating the system's interior surfaces, such processes comprising in some instances a thorough cleaning and baking to eliminate absorbed gases.

The system is evacuated by the mechanical pump 38 attached to the outlet of the diffusion pump 40. After the pressure is reduced to about $5.0 \times 10^{-2}$ TORR, the diffusion pump heater is turned on. Then, liquid nitrogen trap 42 is filled and the evacuation continues. Subsequently, the ion pressure gauge 56 is turned on and opened into the system, e.g., about 30 minutes later. Next, the ion pump 26 is started and engaged into the system by opening the valve 28. The pressure should then be reduced to about $10^{-6}$ TORR. A heater enveloping the gas analyzer 62 is turned on in order to reduce the out gassing of the inner surfaces of the gas analyzer. At first the internal pressure will rise and then drop. The valve 28 connecting the ion pump 26 to the vacuum chamber 12 is then closed, and the valve 34 to the non-evaporable getter pump 32 is opened. As the getter pump 32 is activated it releases gases which will increase the pressure for a certain period of time, and then shortly afterwards the pressure should drop into the $10^{-7}$ TORR region. Next, the power to the gas analyzer 62 is turned on. The system is then allowed to become evacuated for at least overnight before starting a leak check.

During extended periods of nonuse, the ion pump 26 is activated and valve 28 is opened to maintain a low pressure in the system. At the same time the valve 44 to the diffusion pump should be closed. If the valve 44 to the diffusion is left open, there must be liquid nitrogen in the cold trap to eliminate any contaminants from re-entering the vacuum system.

The noble gas leak detector 10 can be calibrated in two ways. The conventional manner is to attach a device called a glass standard leak that has a known leak rate of about $10^{-9}$ std cc/sec of helium. The rate of rise of concentration of helium within the chamber is then monitored. However, there are some errors in this standard procedure, especially since the leak rate may be at best only $\pm 5\%$ of nominal value.

Applicant has discovered a more accurate calibration method using americium 241 alpha as a calibration source. This source is calibrated by the National Bureau of Standards to at least $1\frac{1}{2}\%$ nominal value. The alpha particles released from the americium immediately become helium molecules. An americium source can be purchased with alpha decay up to about 60,000 per second, which equals about $2.25 \times 10^{-15}$ atm cc/sec. The helium molecules from the decay in the americium are allowed to accumulate in a closed volume for a set period of time. When the valve 68 to the system is opened, the increase in the signal can be measured and the calibration obtained for the sensitivity of the system.

Each of the valves identified in the FIGURE is constructed entirely of metal, and they are preferably pneumatically operated valves. Each of the connecting means identified in the FIGURE is constructed entirely of metal in order to avoid any material such as an O-ring which would absorb and then desorb helium and thus contribute to the background. Preferably, the connecting means are mating flanges made of metal using metal gaskets.

A leak detection check is made by first measuring the helium background rise as a function of time. Then the object being tested is externally purged with a noble gas such as helium. This can be done by putting a plastic bag over the object to be tested and flowing helium into the bag to displace the air. Since the nominal value of helium in the atmosphere is 5.24 ppm, the concentration around the object to be tested can be increased greatly. A second measurement is made to determine the ratio of the rise in helium in the vacuum chamber while the object being tested is being purged with helium. The difference between the background and the background plus the increase in rate due to the helium purge is the helium leak rate.

The valves 44 and 28 sealing off the mechanical pump 38, the diffusion pump 40, and the ion pump 26 from the vacuum chamber 12 are preferably pneumatically operated bellow valves, such as those available from Nupro Company of Willoughby, Ohio. The other valves used in the system are preferably all-metal bakeable valves which are available from Varian Industrial Products of Mountain View, Calif. The preferred all-metal flanges and gaskets are also available from Varian Industrial Products.

The improved sensitivity of the noble gas leak detector of the present invention results from: (1) using a non-evaporable getter pump, (2) constructing the internal vacuum system essentially entirely of metal passages, flanges, gaskets, etc., (3) reducing the active gases in the vacuum chamber and allowing the noble gases to accumulate, (4) constructing a vacuum chamber and pumping system designed to reduce the admittance of helium into the system, (5) processing the interior surfaces of the chamber to minimize absorption of gases and out gassing during detection, and (6) calibrating the sensitivity of the system to the americium standard. Thus, except for the electrical feed throughs for the gas analyzer, all materials in the system are metal. The valve and the valve seats are entirely of metal, and the connecting flanges are made of mating metal flanges with metal (e.g., copper) gaskets. An important element is the non-evaporable getter pump which absorbs active gases during leak detection but does not absorb the noble gases. By sealing off other pumps during the leak detection, desorption of gases into the system is reduced.

What is claimed is:

1. In a noble gas leak detector having a vacuum chamber, a gas detector and a getter pump connected through connection means to said vacuum chamber and connection means for placing a test object in gaseous communication with said vacuum chamber, the improvement wherein said getter pump is a non-evaporable getter pump which entraps non-noble gases but not noble gases, each of said connection means consists of metal-to-metal contact surfaces, and said vacuum chamber and equipment connected thereto form an internal vacuum passage consisting of metal.

2. A noble gas leak detector as claimed in claim 1 wherein said connection means consists of metal-to-metal mating flanges, metal gaskets and internal metal passages.

3. In a noble gas leak detector having a vacuum chamber, a gas detector, a getter pump and a pressure gauge connected thereto, and means for placing a test object in gaseous communication with said vacuum chamber, the improvement wherein said getter pump is a non-evaporable getter pump which entraps non-noble gases but not noble gases and said pressure gauge is connected to said vacuum chamber through a valve means enabling said pressure gauge to be sealed from gaseous communication with said vacuum chamber, said valve means having internal passages consisting of metal.

4. A noble gas leak detector comprising:
a vacuum chamber,
means for connecting a test object to said vacuum chamber through a connection means and a valve,
a gas detector connected to said vacuum chamber through a connection means,
a pressure gauge connected to said vacuum chamber through a valve and a connection means,
a gas evacuation means connected to said vacuum chamber through a valve and a connection means, and
a non-evaporable getter pump connected to said vacuum chamber through a valve and a connection means,
said getter pump being adapted to entrap non-noble gases but not noble gases,
each of said connection means consisting of metal-to-metal contact surfaces and internal metal passages,
said vacuum chamber and equipment connected thereto forming an internal vacuum passage consisting of metal,
said valves being adapted to seal said evacuation means and said pressure gauge from gaseous communication with said vacuum chamber so that only said non-evaporable getter pump and said gas detector are in gaseous communication with said vacuum chamber during leak detection.

5. A noble gas leak detector as claimed in claim 4 wherein said connection means consists of metal-to-metal mating flanges, metal gaskets and internal metal passages and said non-evaporable getter pump contains a getter material selected from the group consisting of zirconium/aluminum alloys, zirconium/graphite alloys and zirconium/iron alloys.

* * * * *